AUTOMATIC TRANSFER FOR CONVEYORS

Filed June 11, 1962

3 Sheets-Sheet 1

INVENTORS
MARIO THOMAS SGRICCIA
DEAN V. BROWN
BY THOMAS C. McGOW
Price & Heneveld
ATTORNEYS

AUTOMATIC TRANSFER FOR CONVEYORS

Filed June 11, 1962 3 Sheets-Sheet 2

INVENTORS
MARIO THOMAS SGRICCIA
DEAN V. BROWN
BY THOMAS C. McGOW
Price & Heneveld
ATTORNEYS

AUTOMATIC TRANSFER FOR CONVEYORS

Filed June 11, 1962 3 Sheets-Sheet 3

INVENTORS
MARIO THOMAS SGRICCIA
DEAN V. BROWN
BY THOMAS C. McGOW
Price & Heneveld
ATTORNEYS United States Patent Office 3,175,675
Patented Mar. 30, 1965

3,175,675

AUTOMATIC TRANSFER FOR CONVEYORS

Mario Thomas Sgriccia, Detroit, and Dean V. Brown, Port Huron, Mich., and Thomas C. McGow, Summit, N.J., assignors to Rapistan-Keystone, Detroit, Mich., a corporation of Michigan Filed June 11, 1962, Ser. No. 201,463
16 Claims. (Cl. 198—38)

This invention relates to conveyors, and more particularly to a conveyor system embodying a mechanical selection, de-coding, and article transfer apparatus for conveyor carriers of the trolley type or floor mounted chain conveyor type, especially the recirculating variety.

Conventional conveyor systems utilizing carrier selection principles generally operate on the basis of each carrier associating with, and having its pre-set code "read" by each reading station along the conveyor. In most known apparatuses, this reading action causes a major shifting of each reader unit by each carrier. Consequently, close spacing of carriers or trolleys on the conveyor is impossible. Further, the constantly shifting reader units are subject to rapid wear and short life.

As contrasted to this, it is desirable to achieve a reading and selection function without requiring a major shift of the reader to perform the reading function. Moreover, on circulating conveyor systems, the recirculating carriers should be able to circulate freely without any reading action occurring when the carriers are empty, but be able to readily form a reading association with reading stations along the conveyor when the carriers are loaded. The reading action should occur at each station for each loaded carrier until a selection occurs with matching of a carrier code and code reader. Then the carrier should again be free to recirculate empty until needed again.

While various attempts have been made to achieve this result, existing apparatus having these features utilize complex, electrical switching arrangements and control circuits. Existing apparatus has failed to achieve the desired result because there is needed a dependable, relatively simple, highly versatile, mechanically operating, recirculating carrier conveyor system.

Another characteristic often desired by conveyor users and manufacturers is automatic article transfer from the carriers without supplemental power means.

One excellent way of achieving transfer without auxiliary power means is to utilize as the power source, the energy of the passing carriers. When using code elements interfitting with reader means, however, the force which must be applied to the elements to shift either the carrier or an unloader is very substantial, and tends to interfere with the relatively delicate code system. If auxiliary, sturdy actuator means is used to transmit this force, it is normally inconsistent with "non-reading" recirculation of empty carriers, i.e. the actuator means tends to "actuate" reader units whether or not the code elements are pre-set.

It is therefore an object of this invention to provide a conveyor system capable of simultaneously achieving (1) reading and selection of particular loaded carriers, especially to transfer goods therefrom, (2) free circulation of empty carriers without any reading association occurring, (3) article transfer without auxiliary power means, and (4) relief of reading code elements from the stresses involved in effecting article transfer by the use of sturdy actuator means for this purpose without necessitating constant reading of empty carriers.

It is another object of this invention to provide a conveyor reading and selecting apparatus including actuator means on individual carriers to first bring the carrier and reading station or unit into reading association, but cause a major shift of the reading and selecting unit only with particular selected carriers, and wherein the actuator means is automatically controlled in response to the condition of the code elements to assure a reading function if the code elements are pre-set, and to prevent reading if the code elements are not pre-set.

It is another object of this invention to provide a mechanical reading and selecting unit for conveyor carriers, having automatic code cancellation upon the occurrence of a selection, whereby the carrier thereafter freely recirculates until needed again.

It is another object of this invention to provide a carrier selection system simultaneously enabling recirculation of some carriers, reading association of other carriers with a reading and selector unit, selection of particular carriers by certain reading and selecting units, major shifting of the selector unit only with selection to thereby transfer goods from the carrier, automatic code cancellation of the unloaded carrier, and automatic movement of the actuator means into an active position when code pins are pre-set.

It is still another object of this invention to provide a pre-setter for setting actuator elements on carriers to absolutely control the condition of the actuator elements in response to conditions of the code elements.

It is a still further object of this invention to provide a conveyor reading and selection means capable of achieving all of the above objectives without requiring any electrical circuitry or switching, but rather using relatively simple and dependable mechanical elements.

These and many other objects of this invention will be apparent from a study of the following specification in conjunction with the drawings in which.

Basically, the inventive selective conveyor apparatus comprises a conveyor track adapted to support a plurality of trolleys or carriers moving thereon, a plurality of reading and selecting units mounted therealong, and preferably at least one actuator pin pre-setter mounted along the conveyor.

Each carrier includes a plurality of pre-settable code elements adapted to associate with reader units and be selected by a particular reader unit. Association of the code elements and reader units is controlled and caused to occur by an actuator element on each carrier when the actuator element is in an active position. The actuator elements when active, depress each reading unit into a reading position. If a selection occurs, the actuator causes a major extension shift of the reading and selecting unit under the force of the passing carrier. This can be used to transfer goods from the carrier. Each reader includes an automatic code cancellation surface for the particular selected carrier. Thereby, the carrier with the cancelled code can thereafter freely circulate without associating with the reading units.

The actuator-pin pre-setter assures a reading if at least a predetermined number of code pins are pre-set. It does this by shifting the actuator element into an active position. It also assures passage of carriers without reading, by moving the actuator pin into an inactive position when less than the pre-selected number of code pins are pre-set.

Figures 1, 2, 3, 10:
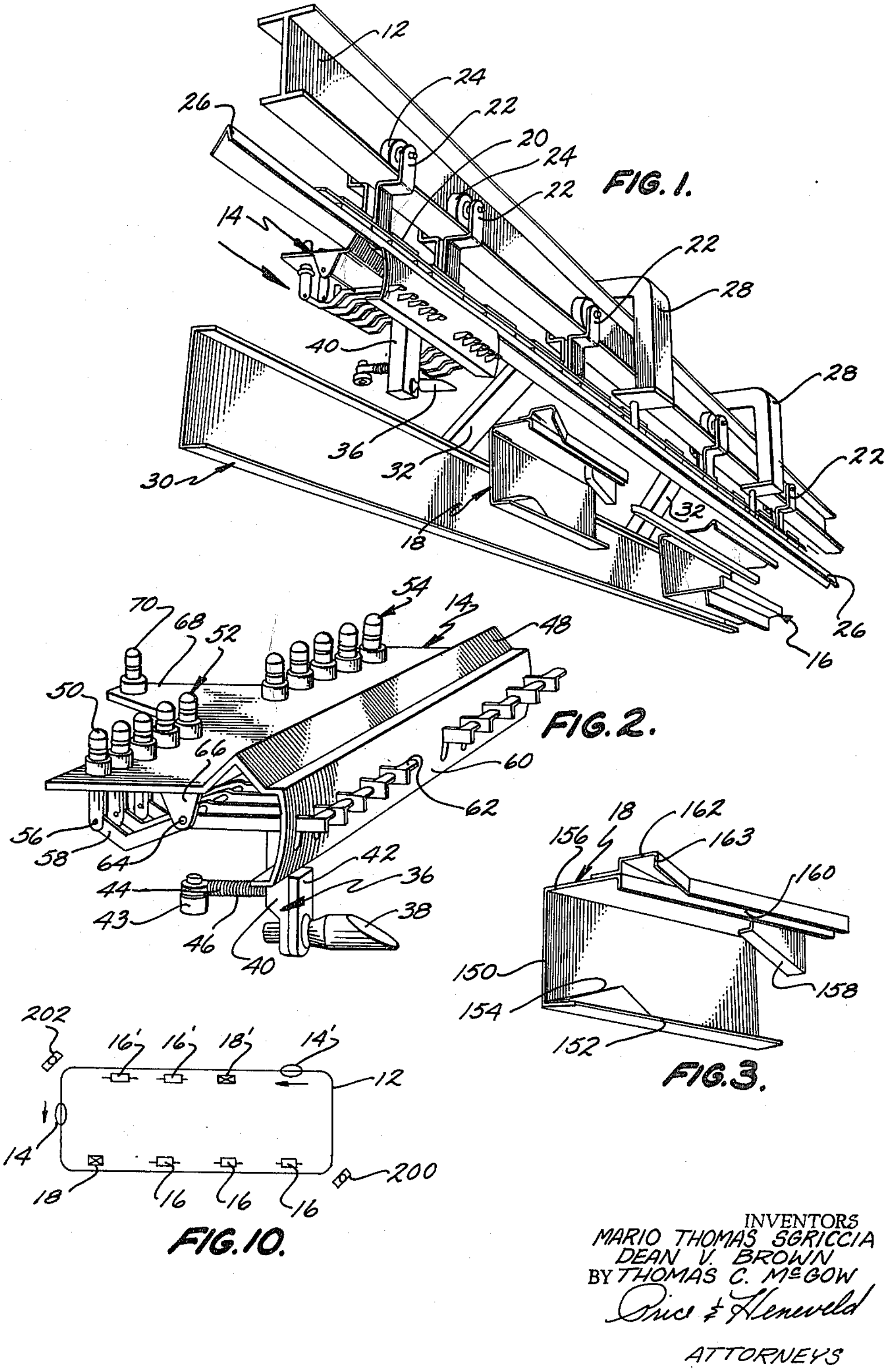
FIG. 1 is a perspective view of a portion of the novel conveyor system showing a conventional carrier drive apparatus, the novel carrier, the novel actuator pin pre-setter, and the novel reader mechanism.
FIG. 2 is an enlarged, perspective view of one form of the novel trolley or carrier.
FIG. 3 is an enlarged perspective view of the pre-setter for the actuator elements on the carrier.
FIG. 10 is a schematic, plan view of a typical conveyor system utilizing the present invention.

Referring to the drawings, in the form of the invention illustrated in FIG. 1, the novel conveyor system 10 includes a conventional overhead conveyor track 12 having a plurality of carriers 14 moving thereon, a plurality of reading units 16 mounted therealong, and at least one pre-setter 18 mounted therealong. The plurality of carriers 14 may be driven by an endless chain 20 suspended from trolley or hanger brackets 22, supported by roller elements 24. Many other equivalent conveyor structures could be utilized within the principles of this invention, as will be readily apparent from a study of the material herein.

Figure 6:
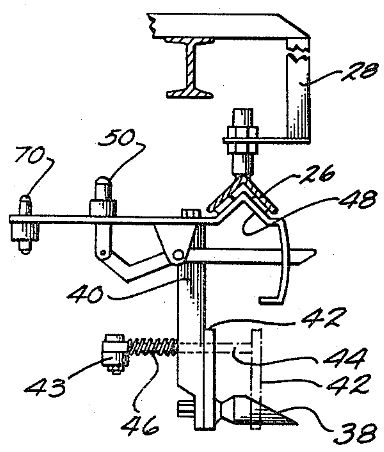
FIG. 6 is an end elevational view of the trolley illustrated in FIG. 2, and its stabilizing means.

An inverted V guide means 26, mounted by clamps 28 from the conveyor, guides the carriers 14 past the pre-setter and reading units, and prevents lateral sway (FIGS. 1 and 6). The pre-setter 18 and reading units 16 are shown mounted on support panel 30 suspended from conveyor track 12 by suitable hangers 32.

Each carrier includes article support means 36 for carrying an article, and enabling its discharge. This means is illustrated in FIGS. 2 and 6 as a supporting pin 38 affixed to the central suspending bracket 40. It includes a groove to hold the article in a hook-like manner. A sweep-off or pin-wiper 42 is mounted on shaft 44 which is biased by spring 46 to its retracted position against support 40. It may be extended to its "wipe-off" position as shown in phantom in FIG. 6. Sweep-off 42 may be actuated by force applied to roller 43 against the bias of spring 44, as explained hereinafter.

Each carrier includes an inverted-V, guide follower 48 to correspond to guide 26 illustrated in FIG. 1. It also has a plurality of settable, shiftable, generally co-planar code pins 50 in two groups 52 and 54. Each of these code pins is vertically movable to raised or active position as illustrated in FIG. 2, or to a depressed or inactive position. Pivotally mounted to the lower end 56 of each of the code pins 50 is a lever 58. One end of each of the levers protrudes from the face 60 of the carrier. These protruding ends include depressible tabs 62 enabling manual shifting of the code pins. The levers 58 are pivotally mounted at their centers adjacent the center of the carrier on shaft 64. This shaft is supported between a pair of depending ears 66 on the carrier.

Each carrier 14 also includes a protruding platform portion 68 on which is mounted an actuator pin 70. Pin 70 is spaced laterally from code pins 50. Pin 70 is also vertically reciprocable between a raised or active position and a depressed or inactive position. Each actuator pin includes a pair of annular grooves 72 and 74 (FIG. 9) cooperable with a spring biased ball 76 to form a ball detent retaining means for either the raised or lowered position. Each of the code pins 50 may include a similar ball detent retaining means for any equivalent thereof. The radially inward biasing force for each detent means may be supplied by an annular, split, spring steel collar 75. In some instances this detent means may not be necessary.

Figure 9:
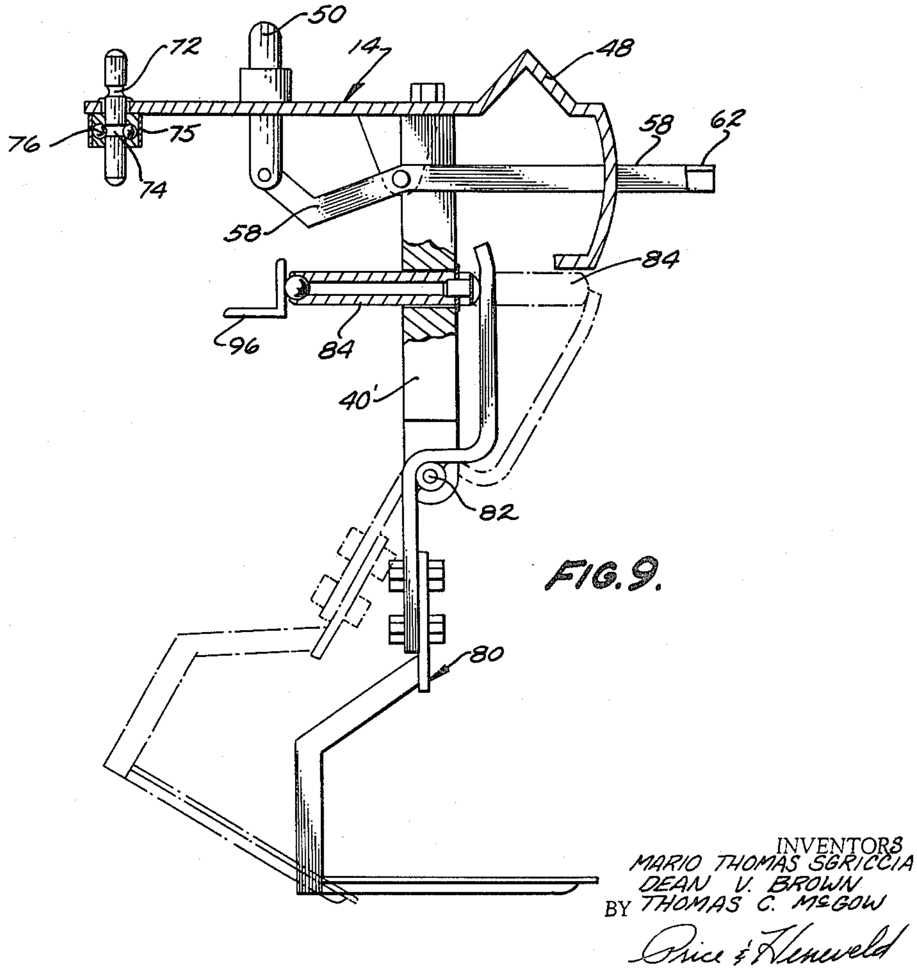
FIG. 9 is an enlarged, end elevational view of another form of the novel carrier illustrating a different type of carrying and unloading means.

Instead of utilizing the article support and sweep-off illustrated in FIGS. 2 and 6, an article supporting tray means 80 as illustrated in FIG. 9 may be utilized. This tray means has a hanger pivotally mounted at its center to shaft 82. Shaft 82 is supported by suspended mounting bracket 40′. When the tray is used, bracket 40′ substitutes for the mounting bar bracket 40 in FIGS. 2 and 6. The bracket 40′ includes an upper, laterally reciprocable pin 84 shiftable from its usual position illustrated in solid lines in FIG 9 to the unloading position illustrated in phantom in FIG. 9. This tilts the platform or tray to discharge articles therefrom in an obvious manner. The remaining features of the trolley or carrier 14 as illustrated in FIG. 9 are the same as those illustrated in FIGS. 2 and 6. It will be obvious from a study of this complete specification, that the details of the carrier, especially the supporting and unloading elements, may be varied widely within the principles of the invention.

Figure 4:
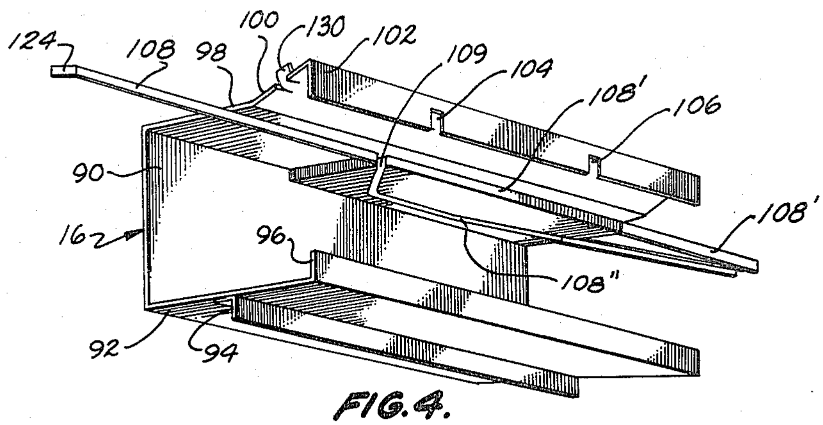
FIG. 4 is an enlarged, perspective view of the novel reading, selecting and transfer unit.

Each of the reader and selecting units 16 may take the shape illustrated in FIG. 4, including a back panel 90, a lower panel 92 and upper panel 98. The lower panel includes depending flange 94 to contact and shift roller 43 for unloading the sweep-off type unit illustrated in FIG. 2, and/or flange 96 to contact pin 84 for unloading the tray type unit illustrated in FIG. 9. Other equivalent unloading or transfer means could conceivably be used.

The upper support panel 98 has a diagonal outer edge surface 100 which protrudes upwardly and outwardly, and terminates in a downwardly directing flange 102. Surface 100 comprises a code cancelling means. Flange 102 comprises a reading surface or track. This reading track includes a plurality of openings 104 and 106, preferably two in number, to correspond respectively with a pair of code pins pre-set from groups 52 and 54. These openings or reading slots 104 and 106 are located at different positions on successive readers to provide a selection function with predetermined carriers.

A separate track 108 is provided on each reader-selection unit for the actuator pin 70 of each carrier. This track, which is spaced behind the reader pin track 102, includes a forked or branched path. One branch 108′ is co-planar with lead-on track 108, and the other branch 108″ comprises a diverting camming track to cause a major shift of the reading unit in a manner and under conditions to be explained hereinafter.

Each reading unit is mounted upon a pair of spaced, parallel legs (FIG. 5) 112 and 114. These may assume the form of a pair of hinges having pivots at the back ends attached to the panel 30, and pivots at the fore ends attached to back panel 90 of reader 16. Thereby, the units can move in the fashion of a parallelogram, with support panel 30 comprising one leg, the entire reader element 16 comprising another leg, and hinge elements 112 and 114 comprising the intermediate legs.

Figure 5:
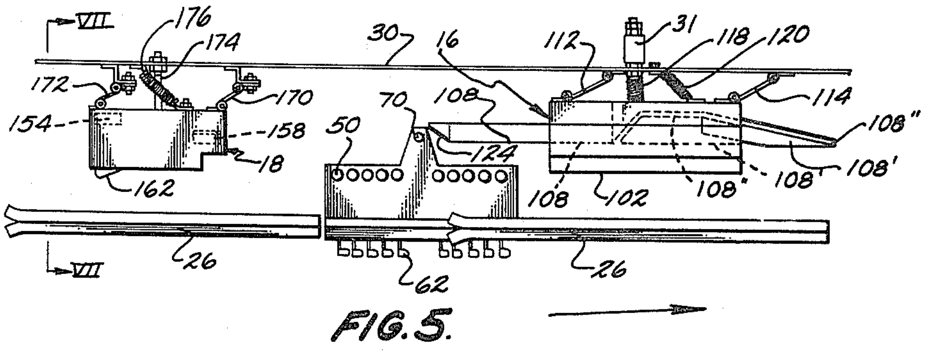
FIG. 5 is a plan view of the apparatus in FIG. 1, showing the general relationships of the moving carrier, the fixed presetter, and the fixed reading unit.

Each reading unit is held in its normal or neutral position illustrated in FIG. 5. It can be swung laterally and longitudinally of the conveyor in a clockwise direction toward support panel 30 from its neutral position when viewed in plan view. It can also be swung in a counterclockwise direction away from panel 30. The reader element is held away from panel 30 in its neutral position by a bumper assembly 118. This bumper assembly includes a pin which extends through panel 30 and an annular sleeve 31 behind the panel. A stiff coil spring is positioned around the pin between its bumper head in contact with the reader and panel 30. The spring is normally in an uncompressed state. The pin can be depressed through sleeve 31 against the bias of the stiff compression spring. It is biased clockwise toward panel 30 and against bumper 118 to its normal position by a tension spring 120 connected between the reader and the panel 30. Since the tension spring is not strong enough to depress the bumper assembly, the reader is thus held in equilibrium in its normal position. Any movement from its neutral position in a clockwise fashion as viewed from the top in FIG. 5 will be against the force of compression bumper 118. Movement in a counterclockwise direction will be against the bias of tension spring 120.

Track 108 for the actuator pin is spaced rearwardly from the main body of the reader element. It includes a lateral ramp 124 in line with the normal movement of actuator pin 70 as the carrier moves linearly along the conveyor. The actuator pin, if in its raised, active position, will therefore depress the reading mechanism a short distance back against the bias of bumper 118 as the pin abuts ramp 124 to depress it and ride along track 108. This slight depression or shifting of the reading element also depresses or shifts the reading surface 102 rearwardly sufficiently to cause code pins 50 to ride adjacent the reading surface 102 to be in reading association therewith. It will be noted that this small shift of the reader does not prevent the reader from associating with following carriers.

Since actuator pin 70 is in constant contact with track surface 108 until the mouth 109 of lateral camming track 108 is reached, the code pins will not quite touch, but be very close to reader track 102. When actuator pin 70 coincides with mouth 109, it allows the reader to move a very slight amount toward the code pins to allow them to contact surface 102 to complete the reading. If the two pre-set code pins 50 from groups 52 and 54 match openings 104 and 106, the bias of the compressed spring on bumper 118 forces the reader outwardly from its depressed position to its neutral position. This causes slots 104 and 106 to pass over the pre-set code pins, and enables actuator pin 70 to enter into and follow divergent cam track 108''. If this occurs, the carrier or trolley forceably swings the reader counterclockwise a substantial distance (FIG. 8) in a parallelogram movement by continued travel of actuator pin 70 along the cam track 108''. This brings either flange 94, or flange 96 into respective operative engagement with either roller 43 or pin 84 (depending on which is used) to discharge the goods from the trolley. This major shift of the reader occurs against the bias of tension spring 120.

Figure 8:
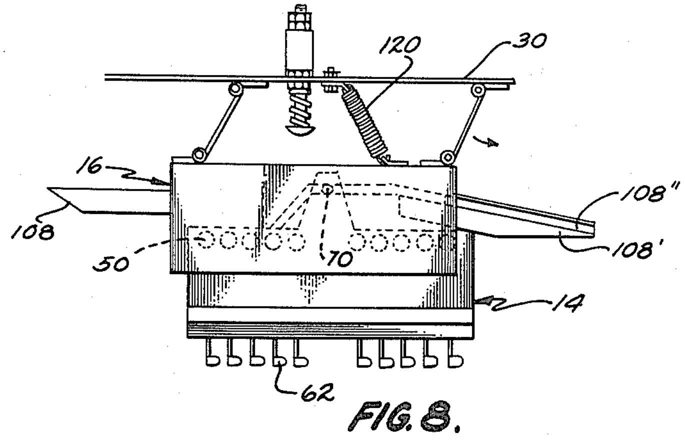
FIG. 8 is a plan view showing an interengaged reading unit and selected carrier, showing how the reading and selecting unit shifts to transfer or unload goods from the carrier.

As the actuator pin 70 passes along the cam track 108'', which extends considerably beyond the reader, the pin finally passes the end of the track, releasing the reader and allowing spring 120 to return reader 16 to its normal equilibrium position illustrated in FIG. 5. As the reader and selector unit swings into extended position (as shown in FIG. 8), slanted surface 100 passes crosswise of the conveyor over the code pins to depress them into their inactive position, thereby automatically erasing or cancelling the code from the particular carrier. Thereafter, the decoded carrier merely circulates freely around the conveyor track.

If, however, the pre-set code pins do not match slots 104 and 106, the code pins will continue closely adjacent surface 102, and actuator pin 70 then rides along surface 108', rather than being diverted into cam track 108''. The reason track 108 is extended out in front of the reader is to cause the centrally positioned actuator pin 70 to depress the reader before the code pins reach reader surface 102. Track 108'' extends beyond the reading surface a considerable distance to keep the reader depressed until the code pins have moved completely past surface 102. Track 108'' is extended beyond the reading surface so that it maintains the carrier extended until the code pins have emerged from behind the flange forming reader 102. These extensions of tracks 108, 108' and 108'' prevent force from being applied to the delicate code pins.

The V-shaped guide track 26 keeps the carrier or trolley from laterally shifting in spite of the lateral forces applied by engagement between the reader and trolley.

The apparatus is preferably set up to operate with two code pins. One code pin is selected from each carrier group 52 and 54. This enables a large number of possible combinations to be selected. Use of only one code pin for the reading function would severely limit the number of possible combinations. Since the device is adapted to operate with two code pins from the respective two groups, the apparatus is designed to prevent operation erroneously or wastefully when only one pin is accidentally set. Also, since the actuator pin controls the occurrence of a reading and an extension, there should be control means preventing reading and unloading action if one or no code pins are raised to a pre-set condition. Further, if the code pins are properly pre-set, i.e. raised, but the actuator is not pre-set i.e. is lowered, there should be control means assuring a reading action, and a shifting action when a matching reader is encountered. To provide these control features, a unique actuator pre-setter unit 18 is provided.

The novel conveyor apparatus with the plurality of carriers and plurality of reader units may be utilized in combination with one or more actuator pin pre-setter units 18 as shown in FIGS. 1, 3, 5 and 7. Each of these actuator control units or pre-setters includes a back support panel 150, a lower panel 152 to mount an upwardly directed cam surface 154, an upper panel 156 to mount a downwardly depending cam surface 158, and a generally inverted U-shaped channel 160 having a flared mouth 162. The back of the pre-setter control is mounted to panel 30 through a pair of hinge elements 170 and 172 having rear pivots mounting the unit to the panel, and front pivots attaching the hinges to the pre-setter.

It is adapted to move as a parallelogram. It is normally biased against a rigid bumper 174 by spring 176. Thus, it can move only counterclockwise in the invention as illustrated. It cannot be depressed in a clockwise fashion as viewed in plan (FIG. 5). Basically, the purposes of the actuator pin pre-setter 18 are mainly to (1) assure a reading of carrier code pins, i.e. an inter-association between reader units and pre-coded carrier units when at least two code pins of the respective groups 52 and 54 are pre-set, regardless of the position of the actuator pin, and (2) prevent any reading, selection, or unloading association from occurring when only one, or no reading pins are raised, regardless of the position of the actuator pin 70. It will be obvious that other minimum numbers of code pins may be the determining factor within the principles of this invention after the operation is explained with respect to the two-pin arrangement.

If a code pin from group 52 has been raised by depression of an appropriate tab 62, and pin 50 from group 54 has been raised to provide a predetermined two-pin combination, and the actuator pin 70 happens to be in the lowered position, when the trolley approaches pre-setter 18, the raised code pins will pass into the flared opening 162 and press against the diagonal camming surface 163. This forces pre-setter 18 to move in a counter clockwise fashion against the tension spring 176, so that the pre-set code pins can pass down channel 160. By so doing, camming surface 154 will be shifted in front of the lowered, inactive actuator pin 70 and cause it to be forceably raised to its active position. Then, when the trolley approaches the reader, the actuator pin 70 will be in a position to depress the reader into a reading condition, and to shift the selector if the code matches the reading slots.

If, on the other hand, only one code pin, for example, a forward pin from group 54 is raised, the code pin will extend pre-setter 18 in a counterclockwise direction to shift cam 154 into the path of the actuator pin and raise the pin. However, as soon as the foreward code pin passes out of channel 160, the pre-setter will shift back or return to its normal condition shown in FIG. 5, thereby shifting cam surface 158 into the path of the just-raised actuator pin. Cam surface 158 will depress actuator pin 70 to its inactive condition. When this carrier approaches the reader, no association will occur between actuator pin 70 and track 108. Rather, the raised code pin will merely contact cam surface 130 (FIG. 4) as it enters the reader, be depressed to an inactive condition, and the carrier will pass by without reading.

If on the other hand, only a rear pin from group 52 is raised, the lowered actuator pin 70 will completely pass cam surface 154 before the rear pin swings the pre-setter outwardly. Thus, the actuator pin will not be raised at all. Then when the carrier approaches reader 16, the rear code pin will merely be depressed by cam surface 130 (FIG. 4) to its inactive condition.

If none of the code pins are raised (i.e. no reading or discharge is desired), but the actuator pin 70 happens to be raised, when the carrier approaches the pre-setter 18 and passes therethrough, none of the code pins will move into channel 160 to swing the pre-setter. The raised actuator pin will pass directly under and into contact with cam surface 158 to be depressed. Thereby no reading occurs when the carrier passes the reader unit.

Thus, it will be seen that the control device is designed to be foolproof in preventing accidental readings and in assuring a reading when one is intended. In sharp contrast to prior devices, this limited and selective reading action may be achieved even though the device harnesses energy from the passing carriers for the article discharge action, and even though a sturdy actuator pin is used to assume the harnessing or shifting force. In other words, the actuator pin does not cause a reading at every station as is usual.

*Operation*

Figure 7:
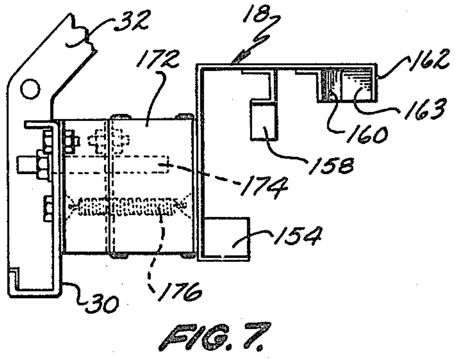
FIG. 7 is an end elevational view of the pre-setter taken on plane VII—VII of FIG. 5.

The complete operation of the apparatus will be briefly explained utilizing the schematic of a typical conveyor set-up as shown in FIG. 10. Here the conveyor track 12 is shown to include a plurality of two carriers 14 and 14′ passing around a closed or recirculating path. The conveyor system also includes two groups of reader elements 16 and 16′. Each reader has different coded slots to select different pre-set codes on passing trolleys. Two actuator pin controllers or pre-setters 18 and 18′ are also included in this system. It will be assumed that persons are standing at positions 200 and 202 in a production line set-up, for example, to load articles into the tray illustrated in FIG. 9 or onto the wipe-off hooks illustrated in FIG. 6. For purposes of illustration, it is assumed that carrier 14′ has just been loaded, and that operator 200 has depressed two keys to raise one code pin in group 52 and one code pin in group 54. These code pins match reading slots in one of the reading and selecting units 16′. As the carrier 14′ passes pre-setting unit 18′, the code pins (50) abut cam surface (163) and swing the pre-setting unit counterclockwise laterally and longitudinally of the conveyor against a biasing spring (176). This action is perhaps best understood by referring to FIGS. 7 and 5. In FIG. 7, the carrier would be moving away from the reader, with the pins in group 54 being lined up directly with diagonal surface 163, not with slot 160. In order for the pin to pass through slot 160, therefore, the unit 18 must move to the right as viewed in FIG. 7. The only way it can shift to the right is by arcuate movement toward the conveyor track 26 and longitudinally thereof (refer to FIG. 5) due to the fact that unit 18 (or 18′) is mounted to its support 30 by a pair of pivotal legs in parallelogram fashion. Thereby, the actuator pin (70) contacts an upward camming surface (154) to raise the actuator pin to its active position. It will be noted that camming surface 154 is placed in the path of the actuator pin only if the unit 18 (18′ in the example) is shifted by the raised code pins. If no code pins in groups 50 and 54 are raised to hit surface 163 and shift unit 18, then, and only then, does cam surface 158 remain in the path of the actuator pin, so that, if it were raised, it would be depressed to an inactive condition. If the actuator pin is raised by cam 154, the carrier will associate with the reading units 16′. A reading association then occurs with each of the reading units 16′. Assuming that the pre-set code is set to match the second reader 16′ to thereby form a selection, the code pins will form a reading association with the first reader and pass it, with the actuator pin passing along track 108–108′ to hold the reader in its depressed reading position. This depression occurs when actuator pin 70 (refer to FIG. 5) contacts diagonal surface 124 and pushes unit 16 (or 16′) back toward support 30 on its links 112 and 114 against the bias of compression spring 118. If the code pins do not match the slots, the unit 16 remains depressed as the actuator pin 70 passes along surface 108 and 108′. After actuator element 70 passes the end of the extended track 108′, the first reader extends or returns to its equilibrium position. The carrier then moves to the second reader. The actuator pin depresses the reader to cause a reading to occur. When the code pins match the code slots in face 102, the reader moves under the bias of bumper 118 to its equilibrium position and the code pins pass through the slots. This potential pin and reading slot correlation occurs just as the actuator pin 70 is in front of the mouth 109 of slot 108″ (see FIG. 4). This allows very slight extension of the reader unit to test whether the pins of groups 50 and 54 match the slots 104 and 106 in surface 102. If they do not, the reader is again depressed very slightly by contact of pin 70 on surface 108′. If they do match, the actuator pin can catch in mouth 109 since there is nothing to prevent the compression spring 108 from extending the reader to its equilibrium or normal position. When the reader extends to its normal position, the actuator pin 70 catches in slot track 108″ and forces the selector unit into a major shift. This major extension shift of the reader is on an arcuate path laterally and longitudinally of the track 26 due to the parallelogram action of legs 112 and 114, as shown in FIG. 8. The extension of the selector causes flange 94 to abut roller 43 and move wiper 42 against the bias of spring 44, to discharge or transfer the article from the hook 36. Thus, energy is harnessed from the trolley to cause the reader to act as an unloader. When the actuator pin 70 reaches the end of track 108″, the reading unit swings back to its equilibrium condition. When the code pins pass through the slots and the reader is extended, angular surface 100 passes over the top of the pins to cancel the code, i.e. lower the pins. If desired, the reader can also be provided with a trailing cam surface to lower the actuator pin as it leaves the reader.

As the trolley passes operator 202, if he has nothing to place on it, it moves on to the pre-setter 18. Since the code pins have not been raised, the raised actuator pin comes into contact with downwardly directed cam surface 158 which moves it to an inactive lower position. The carrier 14′ then circulates freely until needed again. If the operator 202 accidentally raises one of the keys of forward group 54, the pre-setter 18 will first raise the actuator pin 154 and then lower it by cam 158 as explained hereinabove. If a pin of the rear group 52 is accidentally raised, the pre-setter will not raise the actuator pin at all as explained hereinabove. In either of these instances, the camming surface 130 on the reader will lower the inadvertently raised pre-set pins and no reading will occur.

If, on the other hand, the operator at station 202 loads the trolley and raises one of the pins in group 52 and one in group 54, and the actuator pin happens to be lowered, the pre-setter unit 18 will raise the actuator pin due to action of the code pins on surface 163 and channel 160, and the movement of cam surface 154 into the path of the actuator pin. The device will thus assure a proper reading at each of the stations 16.

It will thus be noted that if a pre-set code on a particular carrier is cancelled out by the selection and discharge of articles on that carrier, the carrier will circulate freely without causing any reading action to occur, and without any shifting movement of the readers (either depression or extension) until needed again. It will be realized that this provides extra long life to the reading mechanism. Even when a reading occurs, the reader element is merely shifted slightly into the depressed position, and no major shift occurs unless the codes match to effect an unloading. Thus, the readers are ready to receive following trolleys in an efficient, effective manner.

The device is smooth in operation, completely mechanical in structure and operation. Its design prevents erroneous discharge of articles even if operated by careless workmen.

It will be obvious to those having ordinary skill in the art that various modifications may be made of the apparatus as disclosed, within the principles of the invention as taught. These obvious modifications are deemed to be part of this invention, which is to be limited only by the scope of the appended claims and the reasonably equivalent structures to those defined therein.

We claim:

1. A conveyor mechanism comprising: at least one reading and selector unit and a plurality of carriers; each carrier having settable code means and a pre-settable actuator means spaced from said code means; said selector unit having a code reading track adapted to match a particular code means on one of said carriers, and having a second track adapted to associate with said actuator element; said second track being forked; said actuator means adapted to ride on one branch of said forked track if no match occurs between said code means and reading track, and to ride on a second branch if a match occurs to thereby cause a shift of said unit.

2. A conveyor selecting and transfer mechanism comprising: a selection and transfer unit adapted to be mounted adjacent a conveyor; said unit when mounted being shiftable by a selected carrier to transfer articles from said carrier; a carrier adapted to ride along said conveyor and to associate with said unit; said carrier having a plurality of pre-settable code elements; said unit having a code reading means adapted to select a carrier having a particular pre-set code; said carrier and unit having cooperating actuator means separate from said code elements and adapted, when activated, to cause reading association between said unit and pre-set code and to shift said unit upon the selection of a particular carrier to transfer articles from said carrier; and actuator control means adapted to control said actuator means between an inactive and active condition in response to the condition of said pre-settable code elements.

3. A conveyor selecting and transfer mechanism comprising: a shiftable selection and transfer unit adapted to be mounted adjacent a conveyor; a carrier adapted to ride on said conveyor and associate with said unit; said carrier having a pre-settable actuator element, and having a plurality of pre-set code elements; said unit having a first surface adapted to associate with said code elements, and having a code selecting means in said surface adapted to correspond with a particular plurality of pre-set code elements to select the trolley of said particular code elements; a second surface adapted to associate with said actuator element, when pre-set, in a manner to initiate the reading function of said unit; and said unit including a cam track leading off from said second surface, and only cooperable with said actuator element when pre-set, and when a carrier selection occurs, to shift said unit and cause the transfer function of said unit.

4. A conveyor apparatus, comprising: a conveyor; a plurality of carriers adapted to move along said conveyor; a plurality of reading stations along said conveyor; each of said carriers including settable code means adapted to associate under certain conditions with said reading stations; each of said trolleys also including a reading station actuator adapted to cause association between said code means and reading stations when in an active position; and an actuator setter control mounted along said conveyor; said setter control being shifted only by a preset code means to place said actuator in an active position and thereby assure a reading of carriers having pre-set code means.

5. The apparatus in claim 4 wherein said setter also includes means to shift said actuator from an active position to an inactive position when said code means is not preset.

6. The apparatus in claim 5 wherein each of said reading stations is adapted to shift when associated with a particular pre-set code to select the code carrier; and each of said reading stations includes code cancelling means adapted to cancel the preset code of a selected carrier, whereby the actuator means of said carrier can be rendered inactive by said control and can recirculate freely until needed.

7. A conveyor apparatus comprising: a plurality of carriers, adapted to circulate on the conveyor, each of said carriers having an actuator projection and a plurality of settable code projections; said actuator adapted to bring said code projections into association with a reading unit when in an active position; a plurality of reader and selector units mounted along said conveyor; projection setter means mounted along said conveyor; said setter means having camming surfaces adapted to move said reader actuator into an inactive position when a pre-determined plurality of said code projections is not pre-set, and adapted to be shifted by preset code projections to move said actuator into an active position when said pre-determined plurality of code projections is pre-set.

8. A conveyor apparatus comprising: a conveyor track; a plurality of carriers adapted to move along said track; a plurality of shiftable carrier selector units mounted along said track; pre-settable code projections on each of said carriers; code reading and selecting means on each of said units; each of said carriers including a settable element adapted when pre-set, to depress one of said units from an equilibrium position into a reading condition, and adapted to extend said unit into a carrier-unloading condition when a code means on said carrier matches said code reading means; and at least one pre-setter actuator control mounted along said track and having a cam surface cooperable with pre-set code projections to shift said control to place a second camming surface in the path of said actuator element; said second camming surface adapted to pre-set said actuator element on any of said carriers when said code means is pre-set, to thereby assure a depression of the reading unit and a reading of said code means.

9. A selective conveyor system comprising conveyor track means; a plurality of carriers adapted to recirculate around said track until needed; each of said carriers having shiftable code elements to be set in a plurality of code combinations; a plurality of reading units along said conveyor to read carriers having pre-set codes, and to select carriers having a particular pre-set code; each of said carriers embodying a shiftable, reading unit actuator; actuator pre-setter control means along said conveyor track means, responsive to pre-set code elements on a passing carrier to shift said actuator on the carrier from an inactive to an active position; said active actuator being engageable with said reading units, causing movement of said reading units into reading contact with said code elements to cause reading to occur; said active actuators also causing a major shifting of said reading and selecting unit when a particular carrier is selected; and said carriers freely passing said units without movement of the units into reading or shifting action when said actuator is in its inactive condition.

10. The system in claim 9 wherein said code elements are pins manually axially shiftable by key-actuated levers.

11. The system in claim 9 wherein said code elements are readily manually pre-set by correlative projecting keys, and wherein said actuator pre-setter control means located adjacent said track has camming surfaces actuable by said pre-set code elements to move said actuator on a particular carrier into active position, and to move said actuator to an inactive position if said code elements are not pre-set.

12. The system in claim 11 including code cancellation means to cancel the code only of selected carriers whereby said selected carriers will thereafter freely circulate until needed.

13. A conveyor selector apparatus, comprising: a selection mechanism and article discharge means to be mounted adjacent a conveyor; at least one carrier to ride along the conveyor and controllably associate with said selection mechanism and article discharge means; said carrier having a plurality of pre-settable code elements; said selection mechanism having code reading means to select a carrier having a particular pre-set code; said carrier also having an actuator means shiftable to an active state and cooperable, when so shifted with said article discharge means to activate said discharge means; and control means for said actuator means, responsive to said code elements, to shift said actuator means to an active state.

14. A conveyor selector apparatus, comprising: selector and article discharge means to be mounted adjacent a conveyor; at least one article carrier to ride along the conveyor and controllably associate with said selector and article discharge means; said carrier having shiftable pre-settable code elements, and having a shiftable, article discharge actuator element movable from an inactive condition and an active condition; said selector having code reading means to select a carrier having a particular pre-set code; said actuator element being cooperative with said article discharge means to shift it only when a carrier is selected; and actuator control means responsive to pre-set code elements to shift said actuator element to an active condition.

15. A conveyor selector apparatus, comprising: selector and article discharge means to be mounted adjacent a conveyor; at least one article carrier to ride along the conveyor and controllably associate with said selector and article discharge means; said carrier having shiftable pre-settable code elements, and said carrier having a shiftable, article discharge actuator element mounted thereon and movable from an inactive condition and an active condition; to shift said article discharge means; said selector having code reading means to select a carrier having a particular pre-set code; said actuator element being cooperative with said article discharge means to shift it only when a carrier is selected and actuator shifting means responsive to pre-set code elements to be cooperative with said actuator in a manner to shift the actuator from an active condition, and responsive to the absence of pre-set code elements to be cooperative with said actuator in a manner to shift said actuator to an inactive condition.

16. A conveyor selector apparatus, comprising: selector and article discharge means to be mounted adjacent a conveyor; at least one article carrier to ride along the conveyor and controllably associate with said selector and article discharge means; said carrier having shiftable pre-settable code elements, and having a shiftable, article discharge actuator element movable from an inactive condition and an active condition; said selector having code reading means to select a carrier having a particular pre-set code; said actuator element being cooperative with said article discharge means to shift it only when a carrier is selected; actuator control means responsive to pre-set code elements to shift said actuator element to an active condition; and said control means including a surface to shift said actuator to an inactive condition when said code elements are not pre-set.

References Cited by the Examiner

UNITED STATES PATENTS

| | | | |
|---|---|---|---|
| 1,556,723 | 10/25 | Shaffer | 198—38 |
| 2,798,586 | 7/57 | Freeman | 198—38 |
| 2,931,484 | 4/60 | Muller | 198—38 |
| 2,990,049 | 6/61 | Gerbe | 198—38 |

ERNEST A. FALLER, *Primary Examiner.*

EDWARD A. SROKA, *Examiner.*